United States Patent [19]

Serot

[11] Patent Number: 5,553,901

[45] Date of Patent: Sep. 10, 1996

[54] DEVICE FOR CONNECTING A LENGTH OF DUCT TO A COUPLING ENDPIECE

[75] Inventor: Pierre Serot, Fontenay-aux-Roses, France

[73] Assignee: Legris S.A., Rennes, France

[21] Appl. No.: 325,634

[22] Filed: Oct. 19, 1994

Related U.S. Application Data

[63] Continuation of Ser. No. 998,789, Dec. 23, 1992, abandoned.

[30] Foreign Application Priority Data

Dec. 26, 1991 [FR] France .................................. 91 16173
Dec. 26, 1991 [FR] France .................................. 91 16174

[51] Int. Cl.⁶ ..................................................... F16L 19/06
[52] U.S. Cl. ........................... 285/340; 285/369; 285/354; 285/322
[58] Field of Search ..................................... 285/340, 354, 285/314, 358, 308, 13, 369, 417, 322, 323

[56] References Cited

U.S. PATENT DOCUMENTS

| | | | |
|---|---|---|---|
| 425,369 | 4/1890 | Cowell | 285/13 |
| 1,834,102 | 12/1931 | McCalley | 285/13 X |
| 2,448,888 | 9/1948 | Hynes | 285/340 X |
| 3,058,762 | 10/1962 | Howe | 285/354 X |
| 3,600,010 | 8/1971 | Downs, III | 285/369 X |
| 3,633,944 | 1/1972 | Hamburg | 285/340 X |
| 3,669,475 | 6/1972 | Leckenbill et al. | 285/369 X |
| 3,711,126 | 1/1973 | Hara et al. | 285/369 X |
| 4,000,919 | 1/1977 | Edwards et al. | 285/354 X |
| 4,005,883 | 2/1977 | Guest | 285/369 X |
| 4,072,328 | 2/1978 | Elliot | 285/354 X |
| 4,146,254 | 3/1979 | Turner et al. | 285/369 X |
| 4,373,750 | 2/1983 | Mantelle et al. | 285/369 X |
| 4,432,570 | 2/1984 | Kemppainen | 285/369 X |
| 4,635,975 | 1/1987 | Campbell | 285/354 |
| 4,807,911 | 2/1989 | Short | 285/323 |
| 4,865,359 | 9/1989 | Roberts | 285/369 X |
| 5,160,178 | 11/1992 | Iwabuchi | 285/354 X |

FOREIGN PATENT DOCUMENTS

| | | | |
|---|---|---|---|
| 133670 | 3/1946 | Australia | 285/323 |
| 387081 | 5/1986 | Austria . | |
| 1424837 | 12/1965 | France | 285/340 |
| 2052353 | 3/1971 | France . | |
| 9101480 | 2/1991 | Germany . | |
| 0894671 | 4/1962 | United Kingdom | 285/340 |
| 2117072 | 2/1983 | United Kingdom . | |
| 2186652 | 2/1987 | United Kingdom . | |

Primary Examiner—Terry Lee Melius
Assistant Examiner—Heather Chun Shackelford
Attorney, Agent, or Firm—Griffin, Butler Whisenhunt & Kurtossy

[57] ABSTRACT

The device for connecting a length of duct to a coupling endpiece of an apparatus or a member includes at least one tubular sleeve having two portions in axial succession, the first portion being internally fitted with components of an instant connection coupling for the end of a length of duct, the second portion including means for sealably and releasably covering the coupling endpiece, the end face of the endpiece forming an axial abutment at the end of the length engaged in the first portion of the sleeve.

9 Claims, 4 Drawing Sheets

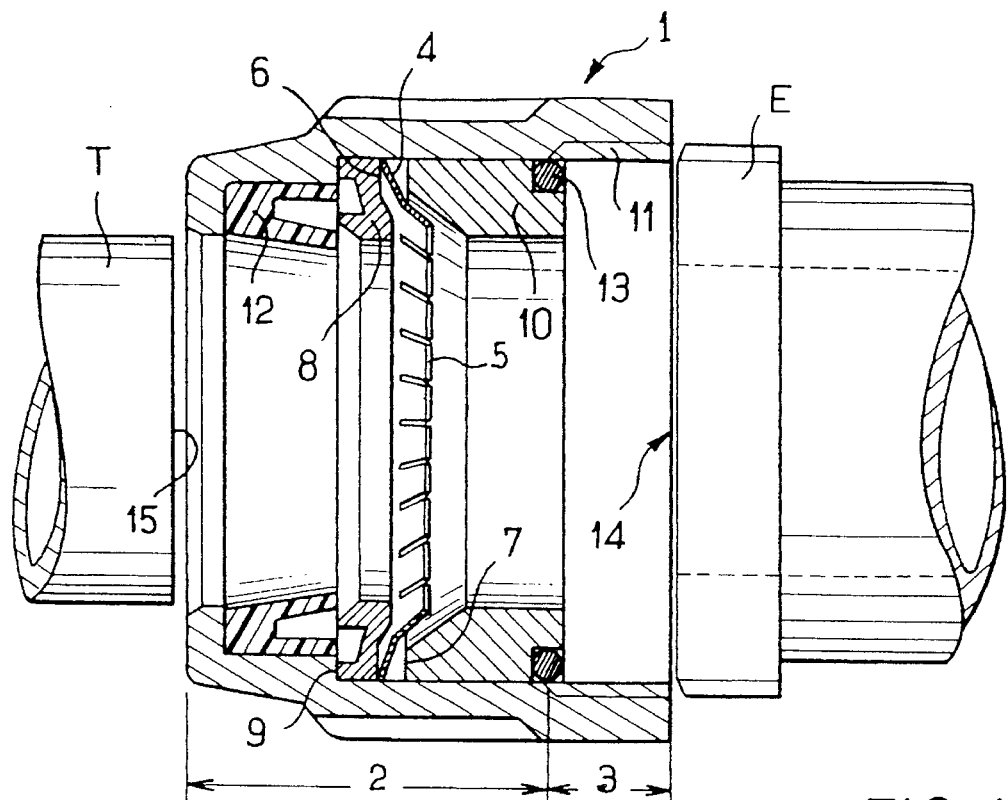
FIG_1
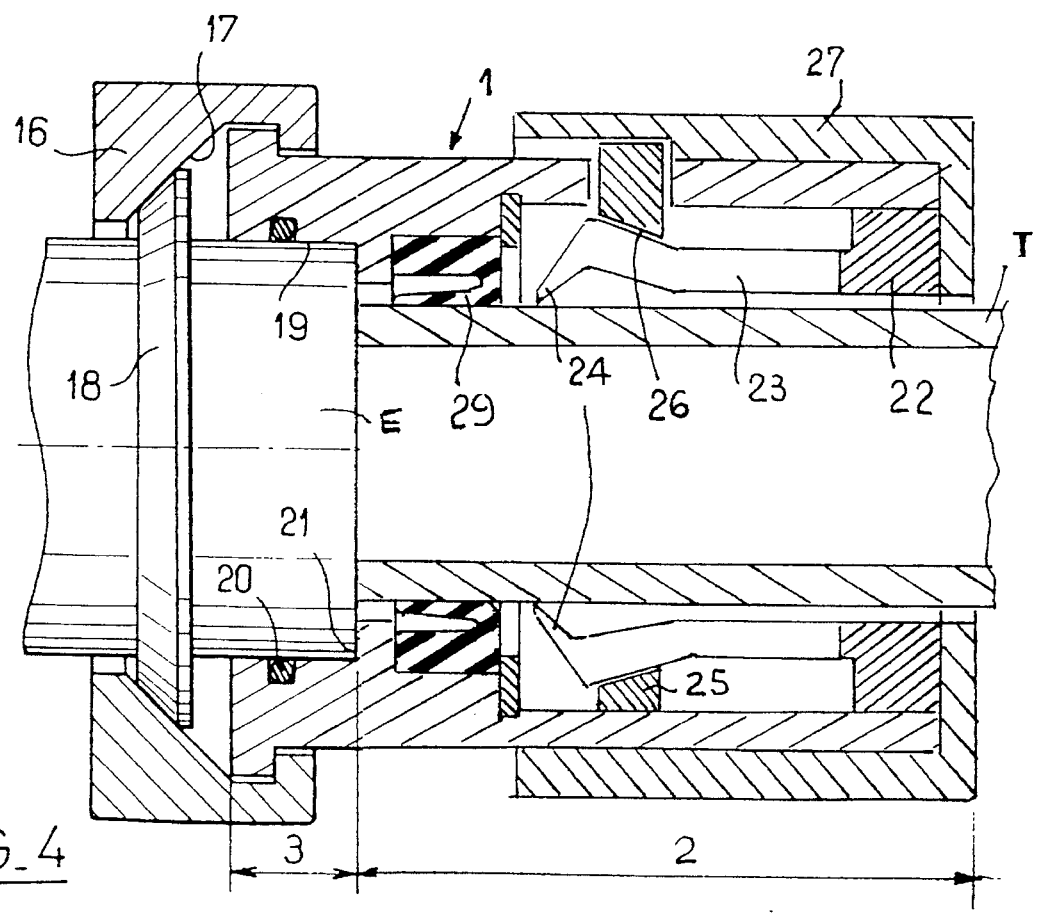
FIG_4

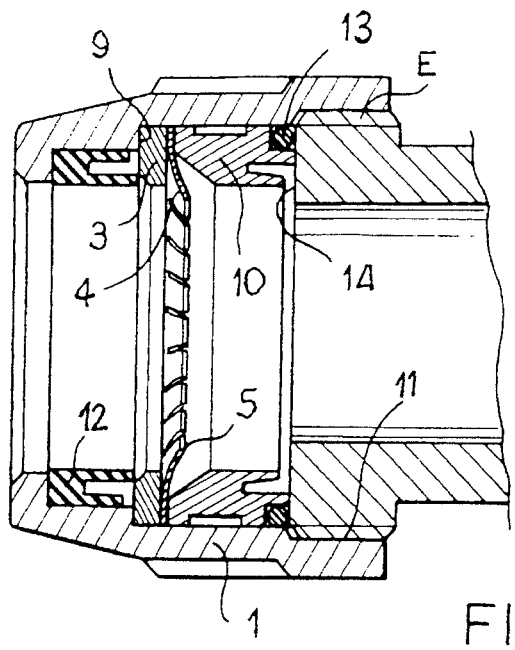
FIG_2
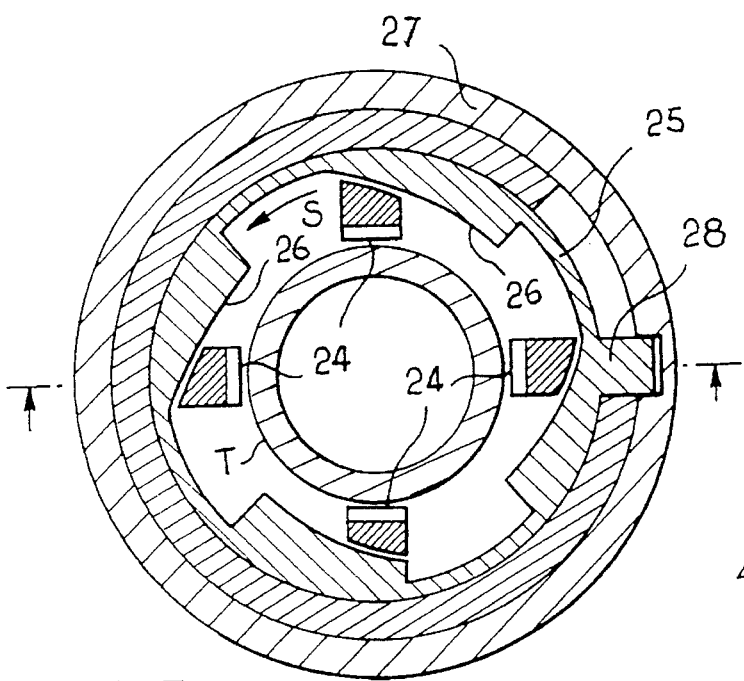
FIG_5
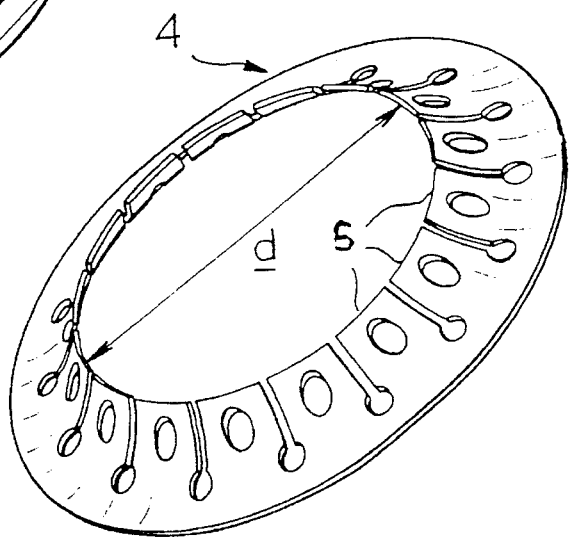
FIG_3

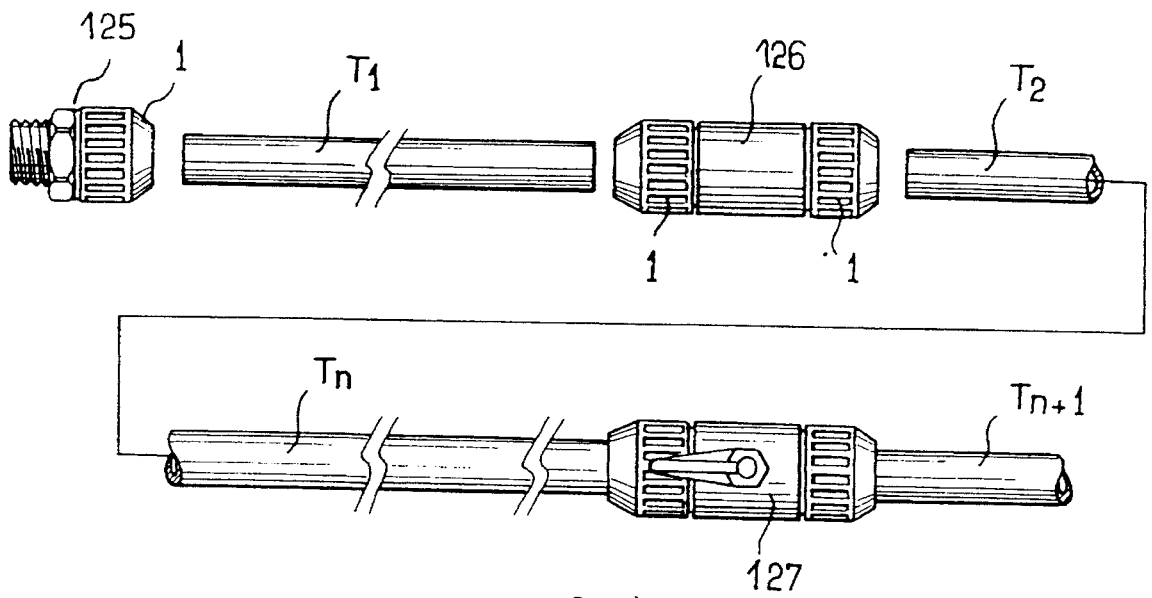
FIG_6
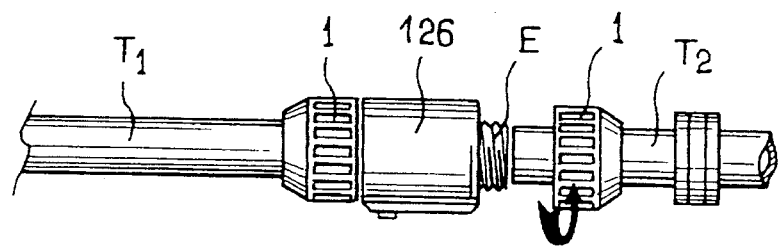
FIG_7
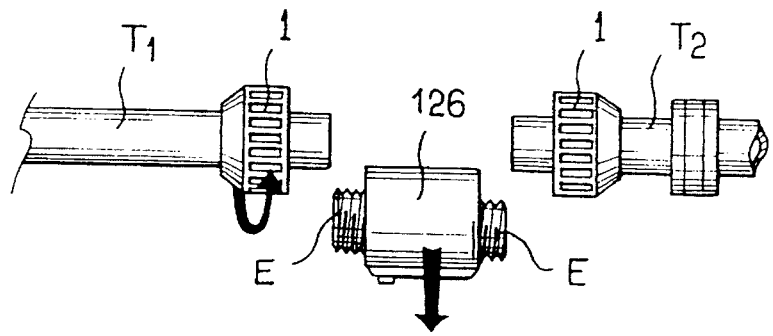
FIG_8

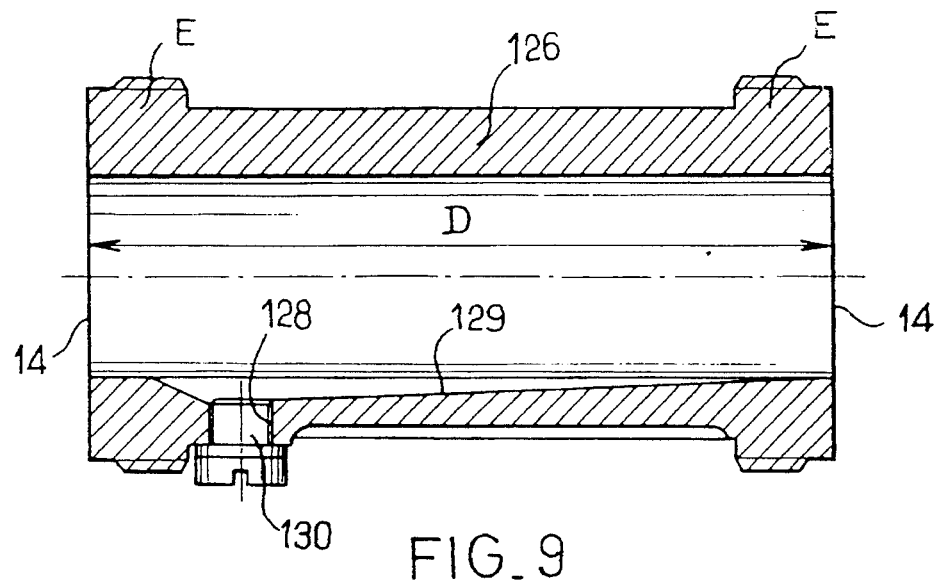
FIG_9
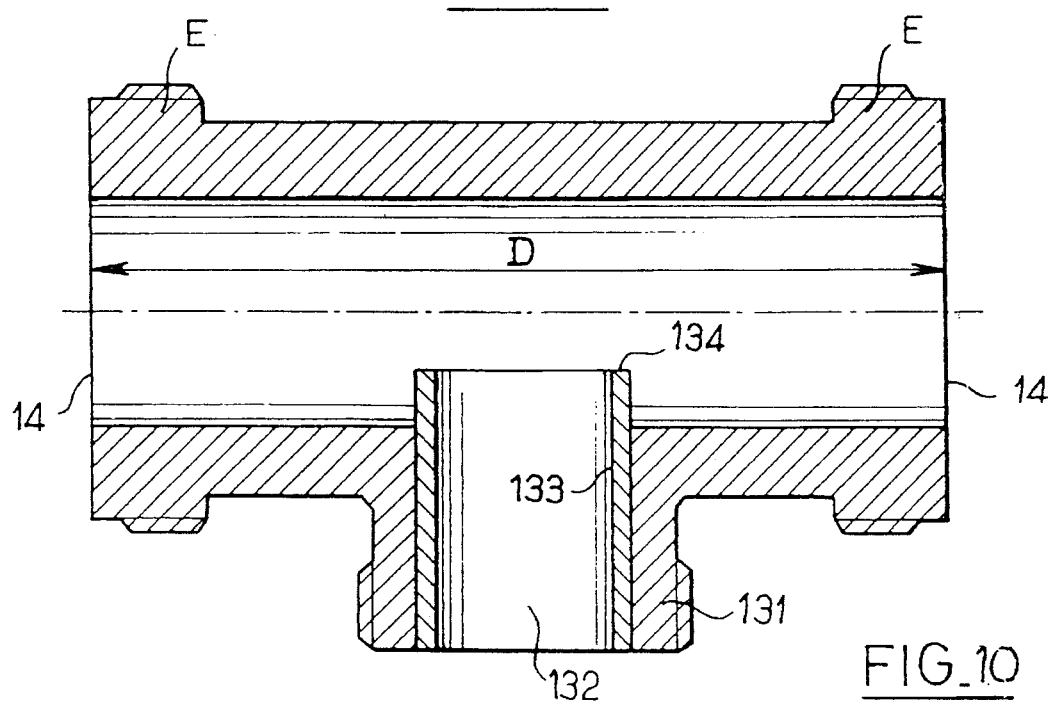
FIG_10
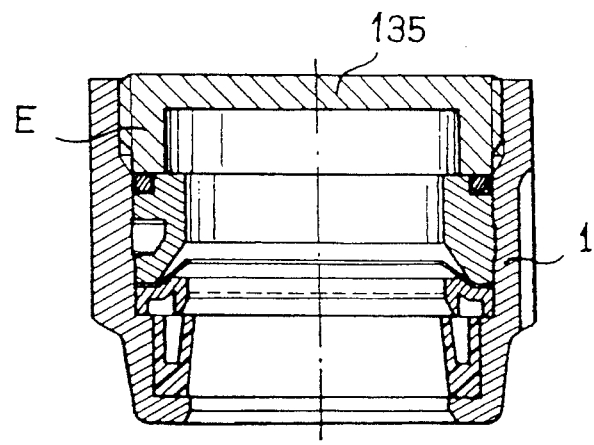
FIG_11

DEVICE FOR CONNECTING A LENGTH OF DUCT TO A COUPLING ENDPIECE

This application is a continuation of Ser. No. 07/998,789, filed Dec. 23, 1992, now abandoned.

The present invention relates to a device for making a connection between a length of duct and a functional component or coupling of a pressurized fluid installation, for the purpose of enabling a fluid distribution network to be established in a manner that is simple, quick, rational, and capable of changing or being reconfigured as a function of changes in user requirements.

BACKGROUND OF THE INVENTION

At present, setting up a distribution network in a factory, e.g. a compressed air network, is essentially a question of plumbing, i.e. of manually installing the ducts that make up the network (cutting pipes to length, shaping lengths on site as a function of local geometrical configurations, and brazing, soldering, or gluing coupling elements or branching elements to the lengths of pipe). Any modification or change to an installation of that type requires it to be completely revised in order to enable such and such an additional branch point to be added or such another branch point to be removed. Even for minor modifications of the installation, e.g. increasing the diameter of a branch thereof to meet increased energy demand on said line, it is necessary to embark on major works that take the installation out of operation for a long time.

The present invention seeks to remedy the drawbacks of present installations and of the techniques for installing them, mainly by proposing connection means that enable a new installation to be installed extremely quickly with it being easy to modify the configuration, thereof, or the nature or location of the functional elements that make it up.

The very nature of the connection means specific to the invention makes it possible to split up the duct(s) constituting the installation or the network into modular lengths or elements that are easy to replace or modify, said lengths being provided in a series of predetermined sizes and including no special end means for connection to the installation. The connection means are concentrated in a special element that is interposed between the end of a length of duct and a functional member, which functional member may be constituted merely by a union or a plug.

SUMMARY OF THE INVENTION

More precisely, in a first aspect, the present invention provides a connection device for connecting a length of duct to a coupling endpiece of a functional member or apparatus, the device including a tubular sleeve comprising two portions in axial succession, the first portion being fitted on its inside with components of an instant connection coupling for the end of the length of duct, the second portion including means for releasably and sealably covering the coupling endpiece, and the end face of the endpiece constituting an axial abutment for the end of the length engaged in the first portion of the sleeve, when the endpiece is covered by the sleeve. This sleeve bringing together the connection means presents numerous advantages. The first is that it can be premounted on the coupling endpieces of a member. Each member fitted in this way can thus be instantly connected to the lengths of duct surrounding it. The second advantage is that by uncovering each endpiece, it is possible to disconnect a member from the lengths of duct that surround it and to withdraw the member without displacing the lengths of duct, each of which carries a tubular sleeve waiting for another member to "re-cover", insofar as that other member is interchangeable with the member removed. This thus provides a connection referred to below as an "instant connection" enabling a elements forming a line to be connected end to end initially, with connections and disconnections subsequently being made perpendicularly to the line.

Preferably, the means for covering the endpiece include tapping in the second portion of the sleeve to co-operate with an outside thread on the endpiece.

It is also recalled that so-called instant connection couplings have been known for many years. Their simplest embodiments essentially consist in a tubular element which is screwed into the tapped orifice of a member such as a manifold, an actuator, a valve, . . . and which includes internal means for receiving the tube in sealed manner and, once engaged, for retaining it therein against a force tending to extract it therefrom. These means that grip the end of the tube inside said tubular element may be of two types. Mention may be made of a slightly conical washer provided with teeth around its inside periphery delimiting an inside through diameter that is smaller than the outside diameter of the tube such that the teeth bite onto the tube. The second known device consists in a kind of tubular bushing having one end split into longitudinal tongues each fitted at its end with a tooth extending radially inwards, said tongues co-operating with a kind of circumferential abutment situated inside the tubular endpiece such that when a force tends to extract the tube from said tubular element, the teeth are urged radially so as to bite into the tube. In this second type, the size of the through passage between the teeth while the bushing is at rest is likewise smaller than the outside diameter of the tube.

Such instant connection devices are generally not releasable. Nevertheless, the need to make them releasable has arisen, and release must be as quick as possible, and to do this, more complicated devices have been created that include tubular pushers interposed between the teeth and the tube, thereby making it possible to move the teeth away from the tube by displacing the pushers relative to the teeth, and thus releasing the tube so that it can be extracted. The pushers generally act in the opposite direction to the direction in which the tube is extracted, such that manipulating couplings of this type is not always very easy, particularly when they are small in size.

It has also been observed that it may be useful to bring the tube into contact with the teeth or the claws of the device for retaining the tube axially in the tubular connection element only after the tube has been inserted into the tubular element. When the through diameter defined by the teeth at rest is smaller than the outside diameter of the tube, inserting the tube causes its end to be scratched and this may be harmful to the quality of sealing, should the sealing ring be situated beyond the teeth in the tube insertion direction. It may be advantageous and simple to retain such a position for the sealing ring while nevertheless avoiding damage from scratches.

To obtain this additional result in the invention, an instant coupling has been created in the first portion of the tubular sleeve forming the above-mentioned connection device, with the components of the instant coupling comprising teeth for retaining the end of the length engaged in the first portion and secured to a support that is deformable between a "rest", first state in which the retaining teeth are disposed completely outside a circumference equal to the outside circumference of the tube to be retained, and a "in-use", second state in which the retaining teeth extend at least in part inside said circumference, while support-deforming means are provided to cause it to pass from its first state to its second state and to maintain it in said second state.

This thus provides a tube-retaining device capable of being engaged or disengaged both before or after the tube has been inserted in the coupling endpiece. Thus, depending on the requirements for the coupling, and in particular on its sealing requirements, the device may be engaged before the tube is inserted, in which case the device acts as a conventional connection device, or the tube can be inserted and then the device can be engaged, such that its teeth penetrate into the outside surface of the tube after it has been inserted, with disconnection being performed in both cases by disengaging, i.e. by taking stress off the support member for the retaining teeth so that the teeth are moved away from the tube, thereby releasing it under the effect of resilient deformation forces acting towards the rest state of the support for the teeth.

Several embodiments of these means are possible. In a first embodiment, the support is constituted by a washer fitted with inside teeth contained in a substantially frustoconical surface whose large base is attached to a continuous outer ring, which is contained in a surface other than a radial plane, the means for deforming the support including two radial surfaces for clamping at least the outer ring of the washer, which surfaces are movable relative to each other in the axial direction inside the endpiece, which surfaces are respectively carried by a radial shoulder of the first portion of the tubular sleeve and by the radial face of a spacer ring whose other face bears against the end face of the coupling endpiece.

Thus, by locking or unlocking the sleeve on the endpiece, e.g. by screw tightening or loosening, the active element of the instant connection is engaged or disengaged. In another embodiment, the support is in the form of a clamp whose arms extend substantially axially with the free ends of the arms forming the tube-retaining teeth, the means for deforming the clamp then comprising camming surfaces that cooperate with the outside portions of the teeth to cause them to go from the first state to the second state and to release them so that they pass from the second state where the teeth are active to the first state where the teeth are inactive due to their own resilience.

The cam surfaces may be controlled manually, either by rotating a ring that enables the teeth to be pushed into the tube, or else by applying axial thrust to a ring having a conical surface which likewise causes said teeth to be pushed inwards.

In another aspect, the present invention provides a network which includes between adjacent lengths of duct: a functional element fitted with endpieces for co-operating with coupling means as described above.

Finally, a third aspect of the invention provides a range of functional or coupling elements, each of which includes two opposite coaxial endpieces whose end faces are spaced apart by a fixed amount regardless of the element concerned.

BRIEF DESCRIPTION OF THE DRAWINGS

Embodiments of the invention are described by way of example with reference to the accompanying drawings, in which:

FIG. 1 is an axial section through the connection device of the invention with the instant connection means being in their disengaged state; FIG. 2 is an axial section through a variant of FIG. 1, with the instant connection being shown engaged;

FIG. 3 is a perspective view of a washer in accordance with the invention suitable for being placed in an engaged state relative to a rest state where it is inactive;

FIGS. 4 and 5 are orthogonal sections of a second embodiment of the invention;

FIG. 6 shows how a portion of a network can be set up in accordance with the invention;

FIGS. 7 and 8 show how a functional member can be disconnected;

FIG. 9 is an axial section through a double union coupling in accordance with the invention, and having a water bleeding outlet;

FIG. 10 is a section view through a branch functional member; and

FIG. 11 is a view of an end element for a network line.

DETAILED DESCRIPTION

FIG. 1 shows a first embodiment of a connection device for connecting together a length of duct T and a coupling endpiece E belonging to a functional member or apparatus installed in line on the duct. The connection device is essentially constituted by a tubular sleeve 1 split into two portions 2 and 3 that succeed each other axially, the inside of the portion 2 being fitted with components for making an instant connection coupling, while the portion 3 is designed to cover in removable manner the endpiece E of the member or apparatus to be connected to the length of duct T.

As shown in FIG. 1, the instant connection means comprise a metal washer 4 which is frustoconical in shape and which has teeth 5 at its inside circumference end for biting into the outside surface of the length of tube T and for preventing it from being withdrawn once it has been inserted into the zone 2 of the sleeve 1. The washer 4 is elastically deformable between the position shown in which the inside diameter of the washer 4 as defined by the ends of the teeth 5 is greater than the outside diameter of the length T, and a position in which the washer 4 is compressed between two radial surfaces 6 and 7, thereby having the effect of changing the angle of the truncated cone and thus of placing the ends of the teeth 5 on a circumference that is smaller than the circumference of the length T.

The surface 6 belongs to a ring 8 which bears against an inside shoulder 9 of the portion 2 of the sleeve 1, whereas the surface 7 belongs to a ring 10 which is axially movable inside said sleeve, with compression of the washer 4 being provided by the action of the endpiece E on the ring 10 when said endpiece E is covered by the portion 3 of the tubular sleeve 1.

In this case, the endpiece E has an outside thread, and in order to cover the endpiece E in releasable manner, the sleeve 1 includes inside tapping 11 in its zone 3. The washer 4 is thus compressed between the two rings 8 and 10, thereby engaging the instant connection elements by screwing the sleeve 1 onto the endpiece E.

Beyond the shoulder 9, the axial zone 2 of the sleeve 1 possesses a lip sealing ring 12 between the sleeve 1 and the length T. The ring 10 has a front sealing ring 13 which provides sealing between the sleeve 1 and the endpiece E. The link between the endpiece E and the duct T is thus sealed.

It should be observed that the front face 14 of the endpiece E constitutes an abutment to the end of the length T being pushed into the sleeve 1 when the endpiece E is screwed into the zone 3 of the sleeve 1. It will be understood that each member or apparatus to be connected to a length of duct T may be prefitted with a sleeve 1 which is screwed onto the endpiece E in such a manner that the instant connection elements included in the sleeve are engaged as shown in FIG. 2. An apparatus fitted in this way is connected to a length T of duct merely by inserting the length T in the sleeve 1, with such insertion being stopped by contact between the end face 15 of the length T and the front face 14 of the endpiece E. The way in which some of the elements in FIG. 2 are embodied is slightly different from the corresponding elements having the same references and shown in FIG. 1. Thus, instead of being frustoconical, the washer 4 may be constituted by a portion of a toroidal surface (see FIG. 3). In the free state, its inside diameter d is greater than the outside diameter of the length of tube T.

Replacing the threaded link between the zone 3 of the sleeve 1 and the endpiece E with some other form of link, does not go beyond the ambit of the invention. For example, they could be a push-fit held together by means of external clamping between flanges placed in corresponding positions on the endpiece E and the sleeve 1 (see FIG. 4).

To release a connection made using the device of FIG. 1, it suffices to unscrew the sleeve so as to disconnect the endpiece E. Such unscrewing gives more and more clearance to the clamped stack 8, 4, 10, and the washer 4 having teeth 5 can thus return to its initial shape in which the ends of its teeth 5 lie outside the diameter of length of tube T. It is then possible to cause the sleeve 1 to slide over the tube T without scratching it.

FIG. 4 shows most of the elements described above and they are given the same references. This figure shows two variants in the implementation of a connection device of the invention, one concerning the means associated with the second axial portion of the sleeve 1 for covering the coupling endpiece E in a sealed and releasable manner, and the other relating to the instant connection means housed in the first axial portion of the sleeve 1.

Thus, the screw coupling between the endpiece E and the sleeve 1 is replaced in this figure by a coupling collar 16, e.g. constituted by two hinged half-portions, and when closed over the sleeve 1 and the endpiece E it serves to hold the endpiece E securely inside a cylindrical bearing surface 19 of the second axial zone 3 of the sleeve 1 because of co-operation between conical surfaces 17 and 18 provided respectively on the collar and on the outside of the endpiece. The second axial zone 3 is provided with a sealing ring 20 and the co-operating conical surfaces act against a shoulder 21 that constitutes an axial limit of the bearing surface 19.

The instant connection means make use of a clamp 22 whose axial arms 23 are resilient and terminated by teeth 24. In the rest position, the tips of the teeth 24 lie on a circumference having a diameter that is greater than the outside diameter of the tube T. These teeth may be constrained to penetrate into the tube T by means of a ring 25 that possesses camming surfaces 26 such that when the ring 25 is rotated in the counterclockwise direction S in FIG. 5, wedging between the tubular sleeve 1 and each of the arms 23 forces the corresponding teeth 24 to penetrate into the tube T if it is already in place in the endpiece, or else the teeth 24 are placed on a circumference of smaller diameter than the outside diameter of the tube T such that if the tube T is then forced into the device after it has been prepared in this way, the tube forces a passage between the teeth 24 which are capable of deforming elastically and of pressing against the outside surface of the tube T. The ring 25 may be controlled by means of an outer angular control ring 27 which co-operates with at least one extension 28 of the ring 25 that passes through the tubular wall of the sleeve 1.

By rotating the ring 27 in the opposite direction, the pressure of the cams 26 on the arms 23 is released, and under their own resilience, the arms return to the rest position, thereby releasing the tube T. It will be understood that if the tube T is inserted before the clamp 22 is closed, then the end portion of the tube which is to co-operate with the sealing ring 29 is not scratched. This guarantees better quality sealing by the seal 29.

Other variant embodiments may be designed without going beyond the ambit of the invention. Thus control may be provided by means of an external pusher that is screwed onto the tubular sleeve 1 at first portion 2 so that a conical cam surface co-operates with the rear of the clamp arms 23 causing them to grip the tube, with unscrewing of said ring thus releasing the arms so as to allow them to return to their rest position. It is possible to use a conventional washer 4, i.e. one having teeth 5 capable of biting the outside surface of the length of tube T even in the rest state, which teeth are capable of being splayed apart by a pusher device that is known per se. Under such conditions, the sleeve, when uncoupled from the endpiece, can also slide over the length T.

FIG. 6 is a fragmentary view showing how a compressed fluid distribution network can be set up in accordance with the invention. Thus, to the left of the figure, a functional element 125 is constituted by a rectilinear connection piece having an outside thread. The coupling endpiece E of said functional element is covered by a sleeve 1 in accordance with the invention which includes both a thread for screwing onto said endpiece and instant connection means for receiving an end of a length T1 of duct. The length T1 is coupled with a following length T2 by means of a double pipe union 126 having at each of its ends respective coupling endpieces on which sleeves 1 are pre-mounted. The union 126 is installed merely by being threaded over the free end of the length T1, and then threading the end of the length T2 into the sleeve covering its other end. Similarly, between a length Tn and a length Tn+1, the network includes a functional element 127, e.g. a manually-controlled valve, which is coupled to said lengths by means of respective connection devices of the invention.

For example, FIGS. 7 and 8 show how easy it is to remove a double pipe union such as that referenced 126 in FIG. 6. This can be done merely by unscrewing each of the sleeves 1 on the endpieces E of said double pipe union and by sliding the sleeves along the lengths T1 and T2 so as to completely disengage the functional element 126, as shown in FIG. 8. The double pipe union can then be replaced by any other functional element which also includes two endpieces E like the double pipe union and in the same places, and suitable for having the sleeves 1 screwed thereon. If the sleeves are embodied as shown in FIG. 1, such screwing of the sleeves serves simultaneously to engage instant connection means for the lengths T1 and T2.

FIG. 9 is a longitudinal section view through a special double pipe union which possesses a bleeder orifice 128 between its two externally threaded endpieces E, the orifice being situated at the bottom of a bottom surface 129 inside the double pipe union and having two slopes. This orifice may be closed by a plug 130 or by any other manually or automatically controlled closure device, and it serves for emptying the duct, and in particular for bleeding off any condensation water it may contain. The inside diameter of said component is naturally equal to the inside diameter of the lengths of duct that it interconnects so as to establish an assembly abutment and so as to avoid setting up any headloss in the duct.

FIG. 10 is a longitudinal section view through another functional member suitable for use in a network made in accordance with the invention. It comprises a T-coupling comprising a third endpiece 131 between two endpieces E. The third endpiece may have an outside thread for being coupled either to an apparatus that has a corresponding tapped bore, in which case it is advantageous for its outside thread to be standardized, i.e. determined by the nominal through diameter of the orifice 132 that it surrounds, or else for receiving the threaded zone 3 of a sleeve 1 belonging to a connection device of the invention. It may be observed that to avoid condensation water present in the horizontal lengths of a distribution network moving down into a vertical branch that may be installed on said horizontal lengths by means of the T-coupling functional element of FIG. 10, it is advantageous to design the orifice 132 so that it opens out into the main bore of the T-coupling interconnecting the two endpieces E at a level that is higher than the bottom surface of said main bore. This result can be obtained by any appropriate means, and in particular by installing an insert 133 in the form of a bushing whose inside end 138 projects far enough into the T-coupling to ensure that it is always situated above the level of any water that may stagnate in the top horizontal duct of the distribution network.

In a variant, the orifice 132 may be delimited by a tapped insert having a standardized diameter enabling any rectilinear coupling to be installed.

It may be observed that one of the advantageous characteristics of the invention lies in the fact that the end faces 14 of the opposite endpieces E of each functional member installed in a network are spaced apart from each other by a distance D which is the same for all of the functional components regardless of whether they are pipe unions, T-couplings, valves, or any other kind of device.

FIG. 11 shows a sleeve 1 of the invention linked to a functional element that comprises no more than a plug 135, i.e. a radial wall fitted with a cylindrical rim forming a threaded endpiece E. The radial wall may include means (not shown) to enable it to be screwed or unscrewed inside the sleeve 1.

Functional elements of the invention are not limited to those described above. They also include, for example, elements having a coupling endpiece E and at the opposite end a thread or a tapping of standardized dimensions to enable a conventional component to be connected.

It may be observed that the sleeve 1 in the embodiment of FIG. 1 has a fluted outside surface to enable it to be rotated manually.

It will be understood from the above that the connection device of the invention, given that it is displaceable along a length of tube once it has been dissociated from the endpiece of the apparatus or the member disposed in line between two lengths, makes it possible to change the configuration of an existing network quickly. In particular, it is possible to design a network on the basis of lengths of duct of different sizes based on a minimum network pitch, with the location of each connection constituting a potential take-off point for a branch from the main line of the network. Similarly, each branch line may be made by connecting together end-to-end lengths of determined size that likewise form a pitch suitable for defining branch line modularity.

It will also be understood that the design of the connection of the invention makes it possible to sell a minimum number of different elements in the form of a kit for making up a network for distributing fluid under pressure within given premises. It is possible to imagine selling modules comprising a given length of duct provided at both ends with respective coupling sleeves 1, the instant connection components being in their disengaged state. Conversely, it is possible to envisage selling the components of a distribution network of the invention with two types of product: bare lengths of duct constituting a first type of component and functional members pre-equipped with connection sleeves clamped or fastened to their endpieces constituting the second type of component, the instant connection component then being in the engaged state.

I claim:

1. A connection device for releasably connecting an end section of a length of duct to a tube fitting body, said body having a tubular end coupling portion limited by a front distal face and provided with external first attachment means adjacent to said front distal face, said device including:
    a generally tubular sleeve in which,
    a first axial section of the sleeve has second attachment means for releasably cooperating with said external first attachment means of said end coupling portion,
    a second axial section of the sleeve integral with said first axial portion has radial grip means for instant connection of the end section of said length of duct to said sleeve, said grip means including a deformable element which is deformable between an operative shape and an inoperative shape, said second axial section having an internal surface facing said front distal face so that when said external first attachment means of the end coupling portion is fully engaged with the second attachment means of the sleeve, said internal surface of said second axial section and said front distal face are in an axial relative position such that said deformable element is in operative shape, said front distal face and said internal surface being the operating means for deforming said deformable element,
    wherein said front distal face is planar, perpendicular to the axis of said tubular sleeve and constitutes an abutment for the end section of the length of duct when inserted axially in the sleeve.

2. A device according to claim 1, wherein the said attachment means of the coupling portion include a tapping in the first portion of the sleeve to cooperate with an outside thread on the end coupling portion.

3. A device according to claim 2, wherein said tubular end coupling portion of said body has an inside diameter equal to the inside diameter of the length of duct and wherein the diameter of said outside thread is greater than the outside diameter of the length of duct to be connected.

4. A device according to claim 1, wherein the grip means comprise a washer having inside teeth contained in a surface that is substantially frustoconical, each tooth being attached to a continuous outer ring, and means for deforming said ring including two radial clamping surfaces for clamping at least said outer ring of the washer and movable relative to each other in an axial direction inside the sleeve.

5. A device according to claim 4, wherein said attachment means include a tapping in said first portion of the sleeve to cooperate with an outside thread on said end coupling portion of the body, and wherein one of the radial clamping surfaces is formed by a radial shoulder on said second section of the sleeve, the other being constituted by a radial face on a spacer ring having an opposite radial face bearing against the front face of the end coupling portion of said body.

6. A device according to claim 5, including another spacer ring between the outer ring of the washer and the radial shoulder of said second portion of the sleeve.

7. A device according to claim 4, wherein the outer ring of the washer is in the form of a portion of a torus.

8. A device according to claim 4, wherein the outer ring of the washer is frustoconical.

9. A device according to claim 1, wherein the grip means include a clamp having resilient substantially axially extending arms, with one end of the arms being provided with tube-retaining teeth, and means for radially deforming the clamp comprising camming surfaces co-operating with the arms to cause them to move the teeth.

* * * * *